United States Patent [19]
Wainio et al.

[11] Patent Number: 4,855,862

[45] Date of Patent: Aug. 8, 1989

[54] RECLOSER UNDERVOLTAGE LOCKOUT MECHANISM

[75] Inventors: Ronald A. Wainio, South Milwaukee; Daniel J. Schreiber, New Berlin, both of Wis.

[73] Assignee: Cooper Industries, Inc., Houston, Tex.

[21] Appl. No.: 52,803

[22] Filed: May 21, 1987

[51] Int. Cl.⁴ .............................................. H02H 3/24

[52] U.S. Cl. ....................................... 361/72; 361/92; 361/102; 361/33; 335/20; 335/21; 335/27

[58] Field of Search .................................. 361/71-73, 361/90, 92, 102, 104, 25, 26, 33; 335/20, 29, 31, 34, 28, 26, 166, 172, 171, 168, 21, 22

[56] References Cited

U.S. PATENT DOCUMENTS

| | | | |
|---|---|---|---|
| 3,590,325 | 6/1971 | McMillen et al. | 361/92 |
| 3,611,215 | 10/1971 | Patel | 335/20 |
| 3,673,538 | 6/1972 | Faxon | 361/27 X |
| 3,940,663 | 2/1976 | Meier et al. | 361/72 |
| 4,625,189 | 11/1986 | Lazar et al. | 335/27 X |

*Primary Examiner*—Todd E. DeBoer

*Attorney, Agent, or Firm*—Nelson A. Blish; Donald J. Verplancken; Eddie E. Scott

[57] ABSTRACT

In a high voltage circuit interrupter (30) or recloser, an auxiliary undervoltage lockout mechanism (300) provides a backup lockout means to deenergize circuit contactor closing solenoid (78). Auxiliary undervoltage lockout device (300) provides a backup means to lock out recloser (30) after a period of time longer than the normal functioning time of the recloser to prevent damage to closing solenoid (78) in the event of low voltage or other unexpected conditions on the power line.

8 Claims, 4 Drawing Sheets

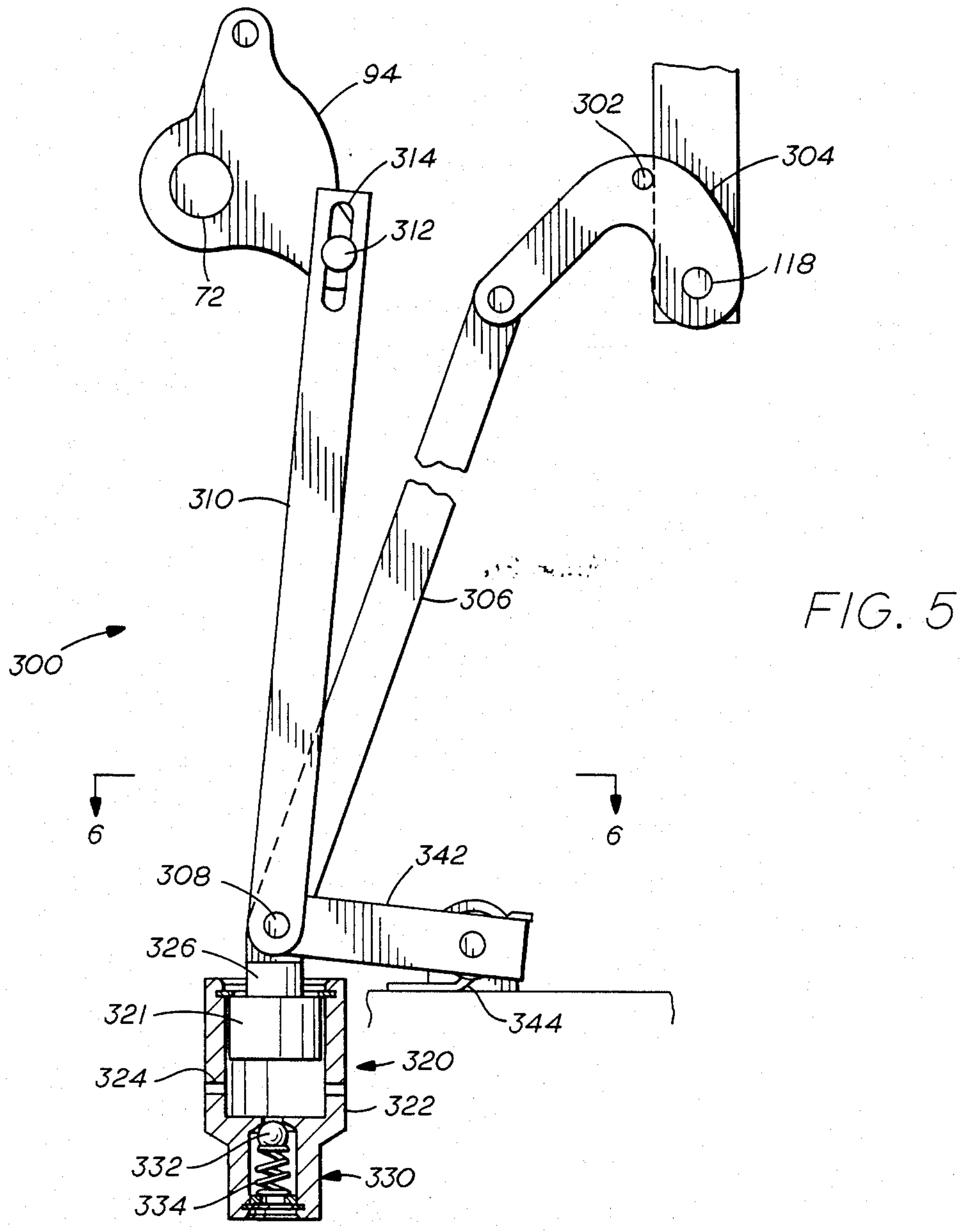
FIG. 5
FIG. 6
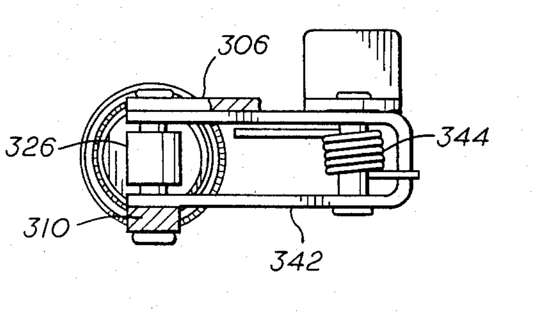

RECLOSER UNDERVOLTAGE LOCKOUT MECHANISM

BACKGROUND OF THE INVENTION

1. Field of the Invention

The present invention relates to high voltage circuit interrupters or reclosers and in particular to a time delayed, spring biased, auxiliary undervoltage lockout mechanism.

2. Background of the Invention

Reclosers, or circuit interrupters, are inserted into power lines to protect a power distribution system. Most faults on power distribution lines are of a momentary nature and of sufficient magnitude to blow fuses if current allowed to be conducted to the fuses. When a fuse does blow in a power distribution system, it is necessary to send a person to change it which is time consuming an expensive. The function of a circuit interrupter is to automatically reenergize power distribution after a momentary fault such as an overcurrent condition or ground fault.

In operation, the circuit interrupter senses the peak value of the current conducted and interrupts its flow by opening or tripping contacts before fuses can blow or equipment can be damaged. After an interval the recloser closes, restoring power to the system, and it remains closed until the next fault is sensed. If the fault was temporary in nature, such a branch momentarily falling against a line, the circuit interrupter will remain closed and the system energized. If the fault remains on the system, the circuit interrupter will again trip open and reclose after a period of time.

Some faults are of a more permanent nature such as those caused by a line falling to the ground. As a consequence, reclosers are built so that they will only trip a limited number of times within a short duration before locking open. Were this not done a recloser would cycle until failure and many of the fuses to be protected would blow anyway. Typically a recloser will allow two shots or trip operations to follow a fast time current characteristic and two additional shots along a somewhat slower time current characteristic before locking open or out.

Reclosers or circuit interrupters are usually self-contained units taking operating energy directly from the system. To effect the reclosing operation, a solenoid powered by line voltage is energized to reclose the main contacts. A problem is sometimes encountered when a low voltage condition occurs on a line such that the contacts energizing the solenoid are closed but voltage on the line is insufficient to reclose the main contacts. In this condition, the solenoid remains energized, but does not reclose the contacts which would de-energize the solenoid. Since the solenoids are designed to be energized only for a short period of time, the solenoids will heat up and fail. This necessitates repair or replacement of the recloser which is both time-consuming and expensive.

SUMMARY OF THE INVENTION

The present invention provides an improved multiphase circuit interrupter or recloser of the type used in conjunction with high voltage electrical power distribution systems. In accordance with one aspect of the present invention, there is provided a circuit interrupter switch having a mechanism for tripping or opening a plurality of switch contacts simultaneously, reclosing the switch contacts after a predetermined time interval and locking out of the contacts in the open position after several reclosing cycles in the event of a permanent fault condition which initiated opening of the contacts. In particular, an auxiliary undervoltage lockout mechanism is provided which has a time delay feature incorporated that will lockout the circuit interrupter after the main contacts have been opened for a period of time. This an auxiliary lockout which locks out or prevents reclosing the main contact after a time delay. This contrast with the main lockout mechanism which locks the circuit interrupter open after a certain number of closing cycles.

BRIEF DESCRIPTION OF THE DRAWINGS

FIG. 5 shows a plan view of an undervoltage lockout mechanism according to the present invention with the main contacts open.

FIG. 6 is a plan view from the top of the undervoltage lockout mechanism shown in FIG. 5.

DESCRIPTION OF THE PREFERRED EMBODIMENT

Figure 1:
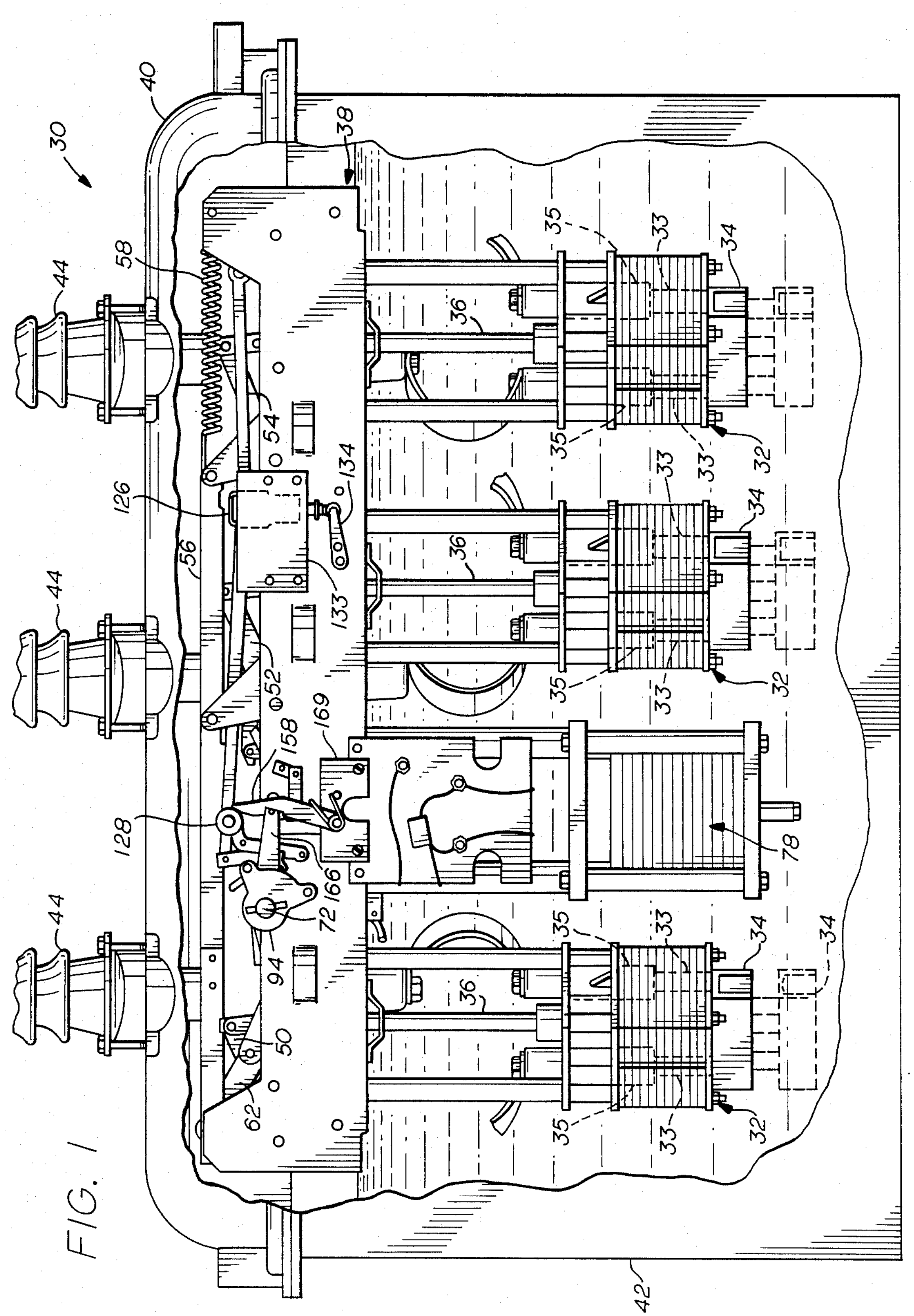
FIG. 1 is a front elevation, partially broken away, of a multiphase circuit interrupter switch.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity.

Referring to FIG. 1, there is illustrated a circuit interrupter device, generally designed by the number 30, of a type typically used on three phase relatively high voltage electrical power distribution systems. The circuit interrupter device 30 is configured in the form of a recloser device, that is, the device is adapted to simultaneously open three contact assemblies 32 to interrupt the flow of current through a distribution network in the event of an overload or fault condition. The device 30 is also adapted to immediately reclose the interrupted circuit and, if the fault condition persists after a specified number of opening and reclosing operations, to effect a lockout condition to prevent further transmission of electrical power through the device.

The contact assemblies 32 are exemplary and are each of a type comprising movable contacts 33 connected to a crosshead member 34 which is, in turn, connected to an operating rod 36. Stationary contacts 35 are engageable with the contacts 33, as shown in FIG. 1. A detailed description of the interrupter contact assemblies 32 is not believed to be necessary to an understanding of the present invention. U.S. Pat. Nos. 2,804,521 and 2,810,038 to Anthony Van Ryan, et al, describe circuit interrupters having interrupter contact assemblies similar to the contact assemblies 32 and reference to these patents may be had for a further detailed description of devices similar in some respects to parts of the circuit interrupter device 30. Those skilled in the art will recognize that other types of circuit interrupting contacts may be used in conjunction with the present invention.

The interrupter contact assemblies 32 are supported on a frame 38 which, in turn, is mounted on a head 40. The head 40 is secured to a tank 42 which may be filled with an insulating and arc interrupting fluid, such as oil, in a conventional manner. The head 40 supports a plurality of insulator bushings 44 which are disposed around and in supportive relationship to suitable conductor members, not shown.

Figure 2:
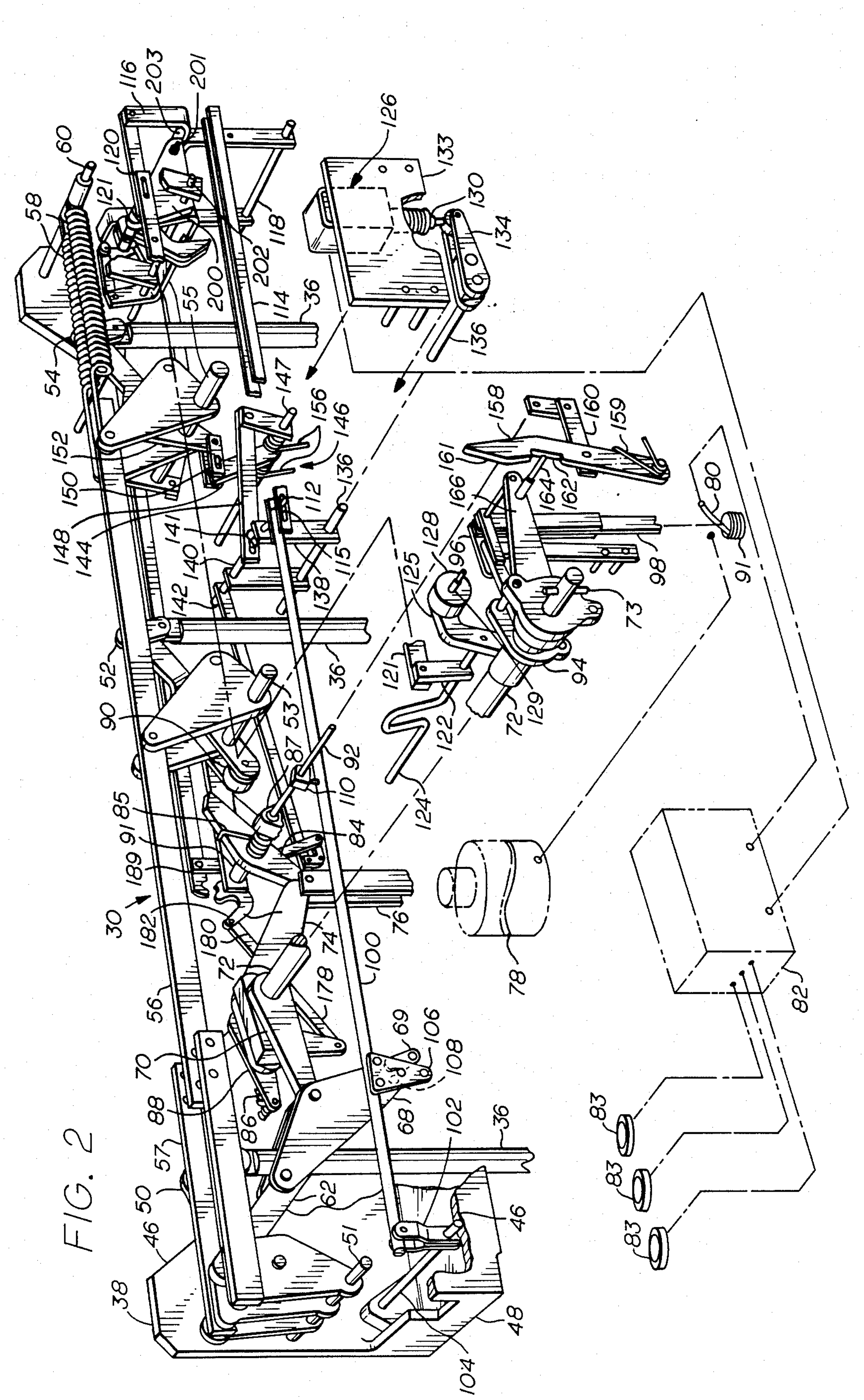
FIG. 2 is a perspective view of the interrupter contact operating mechanism and the control actuating mechanism, portions of which are separated for clarity.

Referring now to FIG. 2, in particular, there is illustrated an arrangement of mechanism for simultaneously actuating the interrupter contact operating rods 36 to simultaneously interrupt the flow of current in all three conductors connected to the interrupter device 30. The frame 38 is characterized by a somewhat channel shaped member having opposed flanges 46 interconnected by a base or web portion 48. Only a portion of the frame 38 is illustrated in the interest of clarity. The operating rods 36 are each connected to respective crank members 50, 52 and 54 which are mounted between the flanges 46 on respective pivot shafts 51, 53 and 55. The crank members 50, 52 and 54 each include portions which are pivotally connected to an elongated transfer bar 56 which includes a yoke 57 at one end and is connected at the other end to a pair of biasing springs 58. The springs 58 are secured at one end to the transfer bar 56 and at their opposite ends to a rod member 60 extending between the flanges 46. The transfer bar 56 is biased to move to the right to move the crank members 50, 52 and 54 in a clockwise direction to extend the interrupter contact operating rods 36 downwardly. The transfer bar yoke 57 is also connected to a toggle latch member 62.

A detailed description of the interrupter contact operating mechanism and control actuating mechanism shown in FIG. 2 is not believed to be necessary to an understanding of the present invention. U.S. Pat. No. 4,625,189 to Lazar, et al, describes circuit interrupters having contact operating linkage, latching mechanism, and control actuating mechanisms similar to those in the present invention and reference to that patent may be had for a further detail description of devices similar in some respects to parts of the circuit interrupter device 30.

The plunger 76 is part of motor means comprising a solenoid actuator 78 which is operable to be energized by closure of a switch 80 which may receive a suitable electrical signal from a control unit 82. The solenoid 78 is operable to be energized or deenergized by actuation of the switch 80.

In response to energization of the solenoid actuator 78, the plunger 76 is moved downwardly to rotate the crank arm 74 and the shaft 72 to a position to lock the latch 62, in the position illustrated. In this position of crank arm 74 a solenoid latch 84 engages the crank arm 74 to hold the plunger 76 against the bias of a spring 86, FIG. 2, connected to a link 88 and which urges the solenoid plunger 76 to move upwardly. The latch 84 is engageable by a roller cam 90 secured to the crank member 52. Accordingly, during movement of the transfer bar 56 the cam 90 engages the latch 84 to pivot the latch to disengage from the crank arm 74. The latch 84 is supported on a tubular shaft 91 which is supported between a boss 87 and a frame flange 46. A shaft 92 is coaxial with and supported partially by shaft 91 and extends in the opposite direction from boss 87 as illustrated.

Referring again to FIG. 2, the shaft 72 is connected to linkage 94 which is operable to engage an arm assembly 96 connected to a solenoid switch actuator.

Suitable manual actuating means, not shown, is adapted to be connected to the lockout latch 200. As the latch 200 is moved in a counterclockwise direction about the axis of shaft 202 a latch edge 201 interferes with a cam surface 203 on the lockout bail 116 momentarily urging the bail to move slightly clockwise about its pivot shaft 118. As the latch 200 is moved the bail 116 repositions itself such that the surface 203 is engaged by the latch edge 201 to latch the lockout bail 116 in the non-lockout position. The solenoid latch 84 can be reset by torsion coil springs 85 which is interactive between the latch and the boss 87 on the frame 38. The trip bar 100 is repositioned by movement of the actuator plunger 130 to its first stable position. However, after a lockout operation is effected, the interrupter contact assemblies 32 must be reclosed to reset the device 30 for further controlled operation.

The operation of the interrupter device 30 is believed to be readily understandable to those of skill in the art from the foregoing description. However, a brief discussion of the major operating steps will now be set forth. Actuation of the control actuator 126 to effect opening or tripping of the interrupter contact assemblies 32 is carried out by energization of the actuator to effect movement of the plunger 130. This movement of the actuator plunger 130 effects movement of the trip bar 100 to the right, viewing FIG. 3, through movement of the arm 134, the link 138 and the shaft 140. Movement of the trip bar 100 to the right causes release of the latch 62 whereby the springs 58 move the transfer bar 56 to the right thereby rotating the crank levers 50, 52 and 54 to move the contact actuating rods 36 downwardly and simultaneously. As the crank lever 52 moves its associated rod 36 downwardly cam 90 engages the latch 84 and rotates same to release the crank arm 74 to move the plunger 76 upwardly. This permits resetting of the latch 62. When the actuator 126 is energized to move its plunger 130 to the second stable position the springs 156 immediately actuate the reset crank 146 to effect resetting of the plunger 130 to the first stable position.

After the trip bar 100 has been moved to effect tripping of the latch 62 it is immediately repositioned which results in positioning of the catch 158 to engage the pin 164 and prevent movement of the actuating member 98 to close the switch 80. Accordingly, reclosing of the contact assemblies 32 is not automatically effected as a result of tripping and opening of the contact assemblies but must await a second control signal from the control unit 82 or a similar source to be delivered to the actuator 126 to effect another cycle of moving the plunger 130 from its first stable position to its second stable position.

With the improved actuator 126 and a suitable control unit such as the control unit 82 a second signal may be delivered to the actuator 126 at a predetermined time to effect reclosing of the contact assemblies 32. When the actuator 126 has been energized to move to the second stable position with the contact assemblies 32 in their open position the catch 158 is moved to release engagement from the pin 164 whereby the actuating member 98 may be urged upwardly to effect reclosing of the switch 80. Reclosing of the switch 80 energizes the solenoid 78 to rotate the solenoid crank arm 74 in a clockwise direction to effect resetting of the linkage interconnecting the rods 36 to the closed position of the contact assemblies 32. As the crank 54 is moved to the position corresponding to the closed position of the contact assemblies 32 the actuator reset springs 156 are recharged and the reset crank assembly 146 is returned in preparation for another operating cycle of the actuator 126. Movement of the shaft 72 in a clockwise direction under the urging of plunger 76 and crank arm 74 will effect downward movement of the switch actuating member 98 through the crank link 94 and the arm assembly 96 so that upon reclosing of the contact assemblies 32 the switch 80 is opened and the solenoid actuator 78 is deenergized.

During the reclosing operation on contact assemblies 32 the catch 158 is momentarily rotated by engagement of the pin 164 with the cam surface 161 until the pin again is disposed in the recess 162 and is secured by the catch.

As aforedescribed, operation of the mechanism to open the interrupter contact assemblies 32 is initiated by receipt of a fault current signal from one or more of the current transformers 83 to the control unit 82 whereupon a signal is transmitted to the control actuator 126. The control unit 82 may be constructed generally in accordance with the device described in U.S. Pat. No. 4,535,409 to James A. Jindrick et al or the system described in U.S. patent application Ser. No. 712,012 filed Mar. 14, 1985 by William N. LeCourt, both assigned to the assignee of the present invention. However, other control mechanisms mây be utilized in conjunction with the control actuator 126.

The undervoltage lockout mechanism shown in general by the numeral 300 and considered to be the improved feature of the present invention is shown in FIG. 5. Undervoltage lockout mechanism 300 is connected to the interrupter contact operating mechanism via shaft 72 and linkage 94. When shaft 72 is rotated in a clockwise direction, it forces linkage 94 in a clockwise direction forcing link assembly 310 downward. Link assembly 310 is connected to linkage 94 by crank pin 312 and slot 314. Link assembly 310 connects to piston rod 326 which in turn is connected to piston 321.

Piston assembly 320 comprised of piston 321, piston housing 322, (hole 324), and piston rod 326 is shown with piston in the raised position. As linkage 94 is rotated clockwise, piston 321 is forced down into housing 322 into the reset position. As piston 321 is forced downward, oil in housing 322 is forced out through check valve 330. Check valve 330 is comprised of a ball 332 and spring 334.

As link assembly 310 is forced down, it forces down bracket assembly 340, which is comprised of bracket 342 and spring 344. Bracket assembly may be seen more clearly in FIG. 6. Forcing bracket 342 in the downward direction puts tension on spring 344.

Arm 306 is connected to linkage assembly 310 and bracket 342 through pin 308. When linkage 310 is forced down, it also pulls arm 306 down. As arm 306 is pulled down, it causes lever assembly 304 to rotate about 118 in a counter clockwise direction. Pin 302 is used to trip the lockout mechanism, described in more detail below, when arm 306 moves upward.

Figure 3:
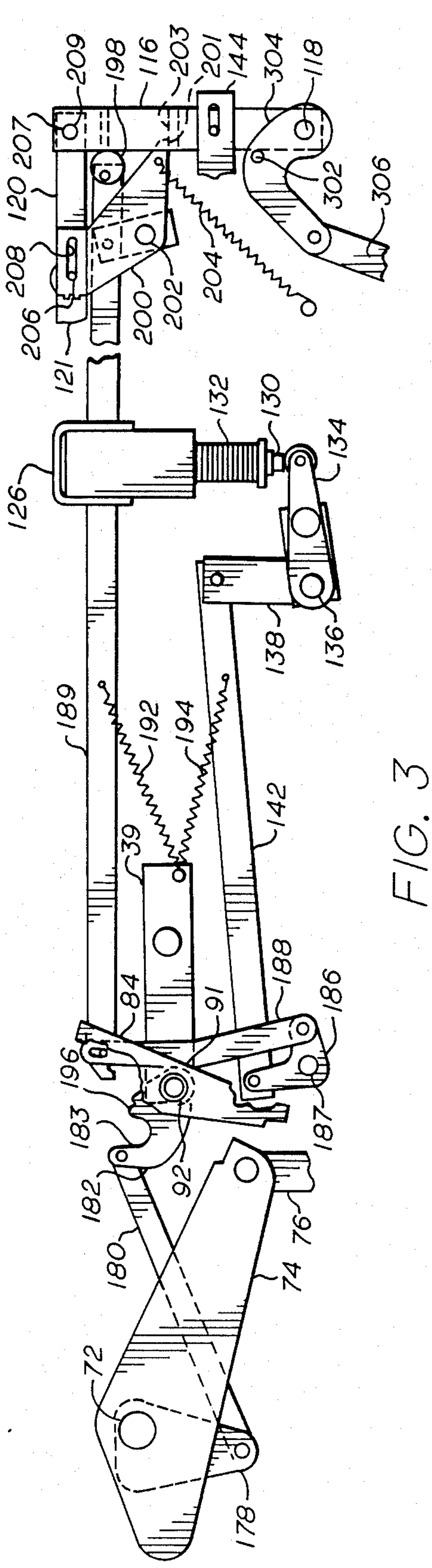
FIGS. 3 and 4 show the operating sequence of the control actuator and associated contact lockout linkage moving from an unlocked condition to a full lockout condition in response to actuation of the control actuator to lock the interrupter contacts in an open position.
Figure 4:
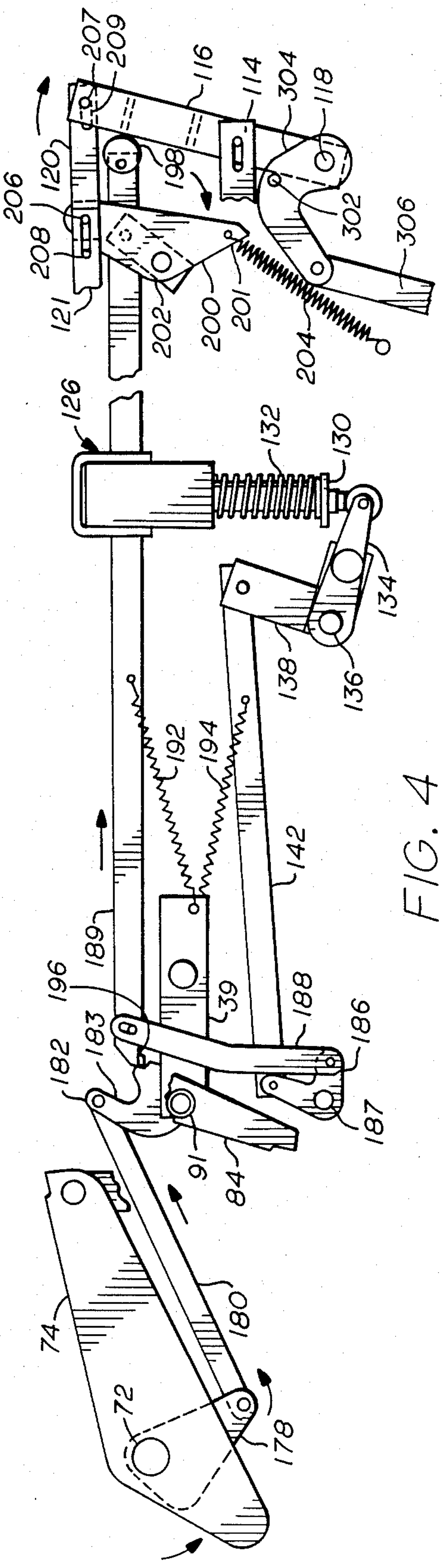

After the recloser has opened main contacts, shaft 72 rotates in a counterclockwise direction. Pin 312 connected to linkage 94 moves freely in slot 314. At this point, spring 344 forces bracket 342 in an upward direction. This also forces arm 306 in upward direction, rotating lever assembly 304 clockwise about pivot 118. The rate of speed at which arm 306 is forced upward depends on oil flow into piston 320 which is controlled by the annular clearance between housing 322 and piston 321. This delay time is long enough so that the recloser has time to function in a normal manner without undervoltage lockout mechanism 300 functioning. However, as the time period increases following the opening of the main contacts, piston 320 rises to a point where holes 324 are exposed. This allows an increased rate of oil flow into housing 322 and increases the rate at which arm 306 moves upward. As arm 306 moves upward and rotates lever assembly 304 in a clockwise manner, pin 302 eventually makes contact with bail 116 forcing it to move right as shown in FIGS. 3 and 4. Holes 324 are used to increase the velocity of arm 306 and increase the power with which pin 302 contacts bail 116.

Thus it is seen that operation of undervoltage lockout mechanism 300 is time dependent based on the inflow of oil into piston assembly 320. The time delay built into the response period of piston assembly 320 is such that under normal conditions the recloser will function in a normal manner. However, during a period of time in which the contacts energizing solenoid 78 have been closed but the main contacts have not been reclosed, the time delay feature of undervoltage lockout mechanism 300 will come into play, tripping open the contacts which energize coil 78 and at the same time locking out the circuit interrupter.

It will be appreciated from the foregoing that a unique control actuator and associated mechanism is provided for a circuit interrupter device for opening and reclosing the interrupter contacts. Moreover, a particularly unique auxiliary undervoltage lockout mechanism is incorporated which will deenergize the closing solenoid after a period of time during which the recloser fails to close the interrupter contacts in a normal manner. The elements described herein may be manufactured of conventional engineering materials used in conjunction with circuit interrupter switch gear and the like.

Although a preferred embodiment of the invention has been described in detail, those skilled in the art will recognize that various substitutions and modifications may be made to the specific embodiment described without departing from the scope and spirit of the invention as recited in the appended claims. In particular, a thermal sensing device, of a type well-known in the art, may be used to sense the temperature of the closing solenoid and, when the closing solenoid temperature becomes hot, indicating the solenoid has been energized for an extensive period, signaling the (controller) to open the main interrupter contacts, deenergize the closing solenoid and lock out the recloser. Also, an electronic device could be used to sense the length of time the closing solenoid has been energized without reclosing the main contacts, and deenergize the solenoid and lock out the recloser. Thus, it is seen that while a hydraulic auxiliary undervoltage lockout mechanism has been described in detail, either a thermal or electronic undervoltage lockout mechanism may also be practiced according to this invention.

We claim:

1. A circuit interrupter for interrupting the flow of electric current through a circuit or power line, comprising:

detection means for detecting voltage transients in the circuit or power line;

signal means for transmitting a control signal upon said detection means detecting a voltage transient;

circuit contact means having circuit contacts for moving said circuit contacts from a circuit closed position to a circuit open position upon receiving a signal from said signal means for selectively interrupting the flow of current through the interrupter;

mechanical linkage for moving said circuit contacts between said closed position and said open position;

a control solenoid for actuating said mechanical linkage in response to said signal from said signal means to cause said mechanical linkage to move said circuit contacts from said closed to said open position;

a switch closed by said mechanical linkage;

linear actuator means for actuating said mechanical linkage in response to said closing of said switch to reclose said circuit contact means by causing said mechanical linkage to move said circuit contacts from said open to said closed position; and lockout means for opening said switch and locking said switch in an open position after said switch had been actuated in the closed position for a predetermined period of time and said mechanical linkage had not moved said circuit contact to said closed position.

2. The interrupter of claim 1, wherein said linear actuator means includes a plunger connected to said mechanical linkage such that said linear actuator means reciprocates said plunger in one direction causing said linkage to move said circuit contact means to the closed position.

3. The interrupter of claim 2, wherein said plunger is disposed on a control shaft to cause said shaft to rotate in response to actuation of said contact means from said closed to said open position; and said lockout means includes a piston disposed in a piston bore, said piston linked to said control shaft such that actuation of said plunger in said one direction causes said piston to seat in said bore, and actuation of the interrupter to open said circuit contact means causes said piston to withdraw from said piston bore.

4. The interrupter of claim 3, wherein said lockout means further includes a mechanical actuator for mechanically locking said switch open.

5. The interrupter of claim 4, wherein said mechanical actuator includes a switch push rod mechanically linked to said control shaft through a switch crank, such that movement of said control shaft in response to actuation of said circuit contact means to the circuit open position closes said switch to energize said linear actuator means to close said interrupter;

a bailed lockout linkage mechanically connected to said switch crank; and a lockout piston linkage mechanically connected to said piston to actuate said bailed lockout linkage to lock said switch closed by said mechanical linkage in the open position through actuation of said piston out of said piston bore.

6. The interrupter of claim 5, wherein said piston bore includes a check valve to permit oil to exhaust therethrough as said piston enters said piston bore and seal said bore when said piston retracts from said bore; and at least one bleed orifice disposed through the diameter of said piston bore.

7. The interrupter of claim 6, wherein said lockout piston linkage is arcuately sectioned into first and second sections hingedly connected, said second section hingedly connected to said bailed lockout linkage and having an actuator pin thereon for actuating said bailed lockout linkage to lock said switch open in response to movement of said piston outward of said piston bore.

8. The interrupter of claim 7, wherein said bailed lockout linkage includes a bail member hingedly connected to said tank to move arcuately with respect to said hinge; and said second section is coaxially hinged with said bail member and sized to permit said pin to engage said bail to arcuately actuate said bail to cause said bail to cause said lockout bar means to move and lock said switch in the open postion.

* * * * *